United States Patent
Shi et al.

(10) Patent No.: US 10,787,916 B2
(45) Date of Patent: Sep. 29, 2020

(54) TURBINE WHEEL ASSEMBLY WITH CERAMIC MATRIX COMPOSITE COMPONENTS

(71) Applicants: Rolls-Royce Corporation, Indianapolis, IN (US); Rolls-Royce North American Technologies Inc., Indianapolis, IN (US)

(72) Inventors: Jun Shi, Carmel, IN (US); Ted J. Freeman, Danville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 123 days.

(21) Appl. No.: 16/016,208

(22) Filed: Jun. 22, 2018

(65) Prior Publication Data
US 2019/0390557 A1   Dec. 26, 2019

(51) Int. Cl.
*F01D 5/30* (2006.01)
*F01D 5/28* (2006.01)

(52) U.S. Cl.
CPC ........... *F01D 5/3015* (2013.01); *F01D 5/282* (2013.01); *F01D 5/3061* (2013.01); *F05D 2220/323* (2013.01); *F05D 2240/24* (2013.01); *F05D 2240/80* (2013.01); *F05D 2300/6033* (2013.01)

(58) Field of Classification Search
CPC ..... F01D 5/00; F01D 5/02; F01D 5/12; F01D 5/14; F01D 5/147; F01D 5/28; F01D 5/282; F01D 5/284; F01D 5/3007; F01D 5/3015; F01D 5/3023; F01D 5/3061; F01D 5/3084; F05D 2240/24; F05D 2240/80; F05D 2300/603; F05D 2300/6033

See application file for complete search history.

(56) References Cited

U.S. PATENT DOCUMENTS

| | | | | |
|---|---|---|---|---|
| 2,781,998 | A * | 2/1957 | Barr | F01D 5/3007 416/220 R |
| 3,702,222 | A * | 11/1972 | Bernales | F01D 5/3007 416/212 R |
| 3,867,069 | A * | 2/1975 | Bussell | F01D 5/3007 416/212 R |
| 4,093,399 | A * | 6/1978 | Glenn | F01D 5/087 416/193 A |
| 4,152,816 | A | 5/1979 | Ewing et al. | |
| 4,802,824 | A | 2/1989 | Gastebois et al. | |
| 8,123,487 | B2 | 2/2012 | Bayer et al. | |
| 2011/0142639 | A1 | 6/2011 | Campbell et al. | |
| 2011/0142684 | A1 | 6/2011 | Campbell et al. | |
| 2011/0243746 | A1 | 10/2011 | Liotta et al. | |
| 2012/0163979 | A1* | 6/2012 | Darkins, Jr. | F01D 5/3092 416/223 R |
| 2013/0022469 | A1* | 1/2013 | McCaffrey | F01D 5/284 416/220 R |

(Continued)

FOREIGN PATENT DOCUMENTS

GB   2050528 A   1/1981

*Primary Examiner* — Brian P Wolcott
*Assistant Examiner* — Elton K Wong
(74) *Attorney, Agent, or Firm* — Barnes & Thornburg LLP (57) ABSTRACT

The present disclosure is related to turbine wheel assemblies for gas turbine engines. Such turbine wheel assemblies may include ceramic matrix composite airfoil components mounted with different types of coupling to a central disc.

20 Claims, 5 Drawing Sheets

(56) References Cited

U.S. PATENT DOCUMENTS

| | | |
|---|---|---|
| 2014/0127026 A1 | 5/2014 | Farineau et al. |
| 2015/0369046 A1* | 12/2015 | Roberge .................... F02K 3/06 |
| | | 60/805 |
| 2016/0130957 A1 | 5/2016 | Freeman et al. |
| 2016/0177748 A1 | 6/2016 | Walston et al. |
| 2016/0186581 A1 | 6/2016 | Dierskmeier et al. |
| 2016/0201483 A1 | 7/2016 | Engel et al. |
| 2016/0201484 A1* | 7/2016 | Engel ...................... F01D 5/326 |
| | | 416/220 R |
| 2016/0305260 A1 | 10/2016 | Freeman |
| 2016/0369638 A1* | 12/2016 | Whitehurst ........... F01D 5/3007 |
| 2017/0146020 A1 | 5/2017 | Kray et al. |

\* cited by examiner

FIG. 9

TURBINE WHEEL ASSEMBLY WITH CERAMIC MATRIX COMPOSITE COMPONENTS

FIELD OF THE DISCLOSURE

The present disclosure relates generally to gas turbine engines, and more specifically, to turbine wheel assemblies used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include discs carrying blades around their outer edges. Some rotating wheel assemblies can include ceramic-containing components. Ceramic-containing components can be designed to withstand very high temperatures while also being lightweight. In view of the potential benefits of including ceramic-containing materials in rotating wheel assemblies, there is a need for further design development in this area.

SUMMARY

The present disclosure may comprise one or more of the following features and combinations thereof.

A turbine wheel assembly includes a disc, a slot-mounted turbine blade, and an edge-mounted turbine blade. The disc may be made of metallic materials and arranged around a central axis. The disc may be shaped to define a plurality of slots spaced around a circumference of the disc. Each slot may extend radially-inward from a radially-outermost surface of the disc.

The slot-mounted turbine blade may include an airfoil that may be made of ceramic matrix composite materials and a root provided by a pair of clamp blocks that engage a radially-inner portion of the airfoil. The root may be received in one of the plurality of slots defined by the disc and shaped to block radially-outward movement to decouple the slot-mounted turbine blade from the disc. The edge-mounted turbine blade may include an airfoil that may be made of ceramic matrix materials and a root provided by a pair of clamp blocks that engage a radially-inner portion of the airfoil. The root being may be bonded to the radially-outermost surface of the disc to couple the edge-mounted turbine blade to the disc.

In some embodiments, the root of the edge-mounted turbine blade may be bonded to the radially-outermost surface of the disc by a braze layer or a weld. In some embodiments, the root included in the slot-mounted turbine blade may be shaped to extend radially-outward of and to circumferentially overlap a portion of the root included in the edge-mounted turbine blade to block radially-outward movement of the edge-mounted turbine blade away from the disc.

In some embodiments, the pair of clamp blocks that provide the root of the slot-mounted turbine blade may be shaped to provide a platform. The platform may extend circumferentially from the airfoil included in the slot-mounted turbine blade to block hot gases interacting with a radially-outer portion of the airfoil from moving radially-inward toward the disc.

In some embodiments, the pair of clamp blocks that provide the root of the edge-mounted turbine blade may be shaped to provide a platform. The platform may extend circumferentially from the airfoil included in the edge-mounted turbine blade to block hot gases interacting with a radially-outer portion of the airfoil from moving radially-inward toward the disc.

In some embodiments, the platform of the slot-mounted turbine blade may extend axially-forward and axially-aft of the airfoil included in the slot-mounted turbine blade. In some embodiments, the platform of the edge-mounted turbine blade may extend axially-forward and axially-aft of the airfoil included in the edge-mounted turbine blade.

In some embodiments, the pair of clamp blocks included in the slot-mounted turbine blade may be each shaped to include a recess that receives the radially inner portion of the airfoil included in the slot-mounted turbine blade. The pair of clamp blocks included in the slot-mounted turbine blade may be bonded to one another.

In some embodiments, the pair of clamp blocks included in the edge-mounted turbine blade may be each shaped to include a recess that receives the radially inner portion of the airfoil included in the edge-mounted turbine blade. The pair of clamp blocks included in the edge-mounted turbine blade may be bonded to one another.

According to another aspect of the present disclosure, a turbine wheel assembly may include a disc, a slot-mounted turbine blade, and an edge-mounted turbine blade. The disc may be made of metallic materials arranged around a central axis. The disc may be shaped to define a plurality of slots spaced around a circumference of the disc that each extend radially-inward from a radially-outermost surface of the disc.

The slot-mounted turbine blade may include an airfoil made of ceramic matrix composite materials and a root that engages a radially-inner portion of the airfoil. The root may be received in one of the plurality of slots defined by the disc and may be shaped to block radially-outward movement to decouple the slot-mounted turbine blade from the disc. The edge-mounted turbine blade may include an airfoil made of ceramic matrix materials and a root. The root may be bonded to the disc to couple the edge-mounted turbine blade to the disc.

In some embodiments, the edge-mounted turbine blade may be arranged circumferentially adjacent to the slot-mounted turbine blade. The edge-mounted turbine blade may be bonded to the radially-outermost surface of the disc.

In some embodiments, the edge-mounted turbine blade may be bonded to the radially-outermost surface of the disc by one of a braze layer and a weld. In some embodiments, the root of the edge-mounted turbine blade may be made of metallic materials. In some embodiments, the root of the slot-mounted turbine blade is made of metallic materials.

In some embodiments, the root of the edge-mounted turbine blade may be provided by a pair of clamp blocks shaped to receive a radially-inner portion of the airfoil included in the edge-mounted turbine blade. The pair of clamp blocks may be bonded to one another to prevent movement of one clamp block away from the other.

In some embodiments, the root of the edge-mounted turbine blade may be provided by a wrap. The wrap may be shaped to receive a radially-inner portion of the airfoil included in the edge-mounted turbine blade.

In some embodiments, the wrap may be shaped to further provide a platform of the edge-mounted turbine blade. The platform may extend circumferentially from the airfoil included in the edge-mounted turbine blade to block hot gases interacting with a radially-outer portion of the airfoil from moving radially-inward toward the disc.

In some embodiments, the root of the slot-mounted turbine blade may be provided by a pair of clamp blocks. The pair of clamp blocks may be shaped to receive a radially-inner portion of the airfoil included in the slot-mounted turbine blade. The pair of clamp blocks may be bonded to one another to prevent movement of one clamp block away from the other.

In some embodiments, the root of the slot-mounted turbine blade may be provided by a wrap. The wrap may be shaped to receive a radially-inner portion of the airfoil included in the slot-mounted turbine blade.

In some embodiments, the wrap may be shaped to further provide a platform of the slot-mounted turbine blade. The platform may extend circumferentially from the airfoil included in the slot-mounted turbine blade to block hot gases interacting with a radially-outer portion of the airfoil from moving radially-inward toward the disc.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
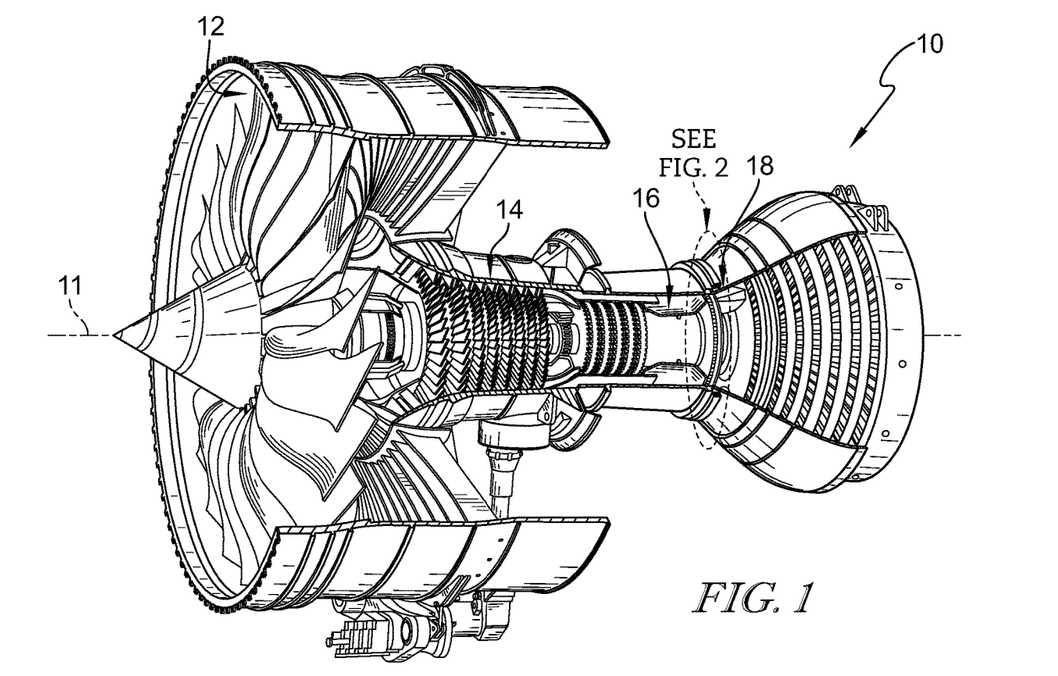
FIG. 1 is a perspective view of a gas turbine engine with a portion of the engine cut away to show, from left to right, a turbofan, a compressor section, a combustor, and a turbine section included in the engine.

An exemplary gas turbine engine 10 according to the present disclosure is shown in FIG. 1. The engine 10 includes a turbofan 12, a compressor section 14, a combustor 16, and a turbine section 18. The fan 12 rotates to provide thrust to an associated aircraft. The compressor section 14 draws in air and compresses it increasing pressure of the air before delivering it to the combustor 16. In the combustor 16, fuel is mixed with the pressurized air from the compressor section and is ignited to create hot high-pressure combustion products. The combustion products move out of the combustor and into the turbine section 18 where they interact with the turbine section creating rotation of some turbine section 18 components that, in turn, drive rotation of the fan 12 as well as some components of the compressor section 14.

Figure 2:
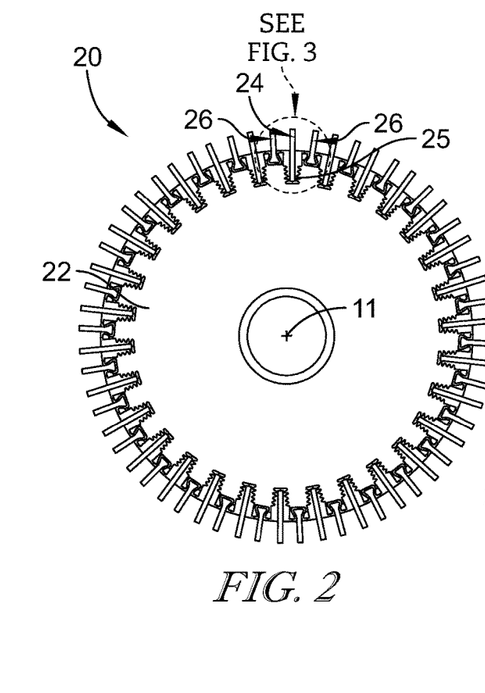
FIG. 2 is a cross-sectional elevation view of a turbine wheel assembly used in the turbine section of the engine of FIG. 1 showing that the turbine wheel assembly includes a disc and turbine blades mounted around the outer diameter of the disc.
Figure 3:
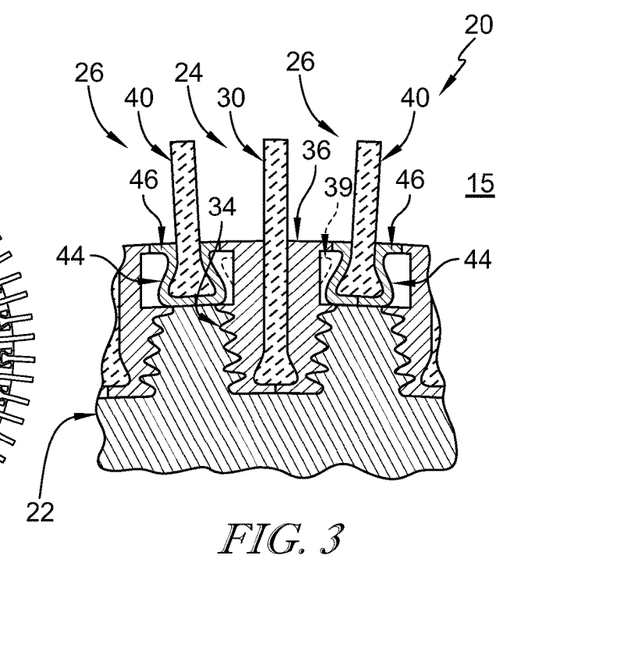
FIG. 3 is a detail view of a portion of FIG. 2 showing that the turbine wheel assembly includes turbine blades of two different varieties, specifically, slot-mounted turbine blades with root features of a fir-tree shape that are inserted into slots formed in the disc and edge-mounted turbine blades with root features coupled to the disc along a radially-outwardly facing surface of the disc between slots formed in the disc.

A first turbine wheel assembly 20 adapted to be included in the turbine section 18 of the engine 10 is shown in FIGS. 2-5. The turbine wheel assembly 20 is designed to rotate upon interaction with expanding combustion products from the combustor 16. The turbine wheel assembly 20 includes a metallic disc 22 and different types of turbine blades 24, 26 as shown in FIGS. 2 and 3. Each turbine blade 24, 26 however incorporates components made of ceramic matrix composite materials adapted to withstand very high temperatures.

Figure 4:
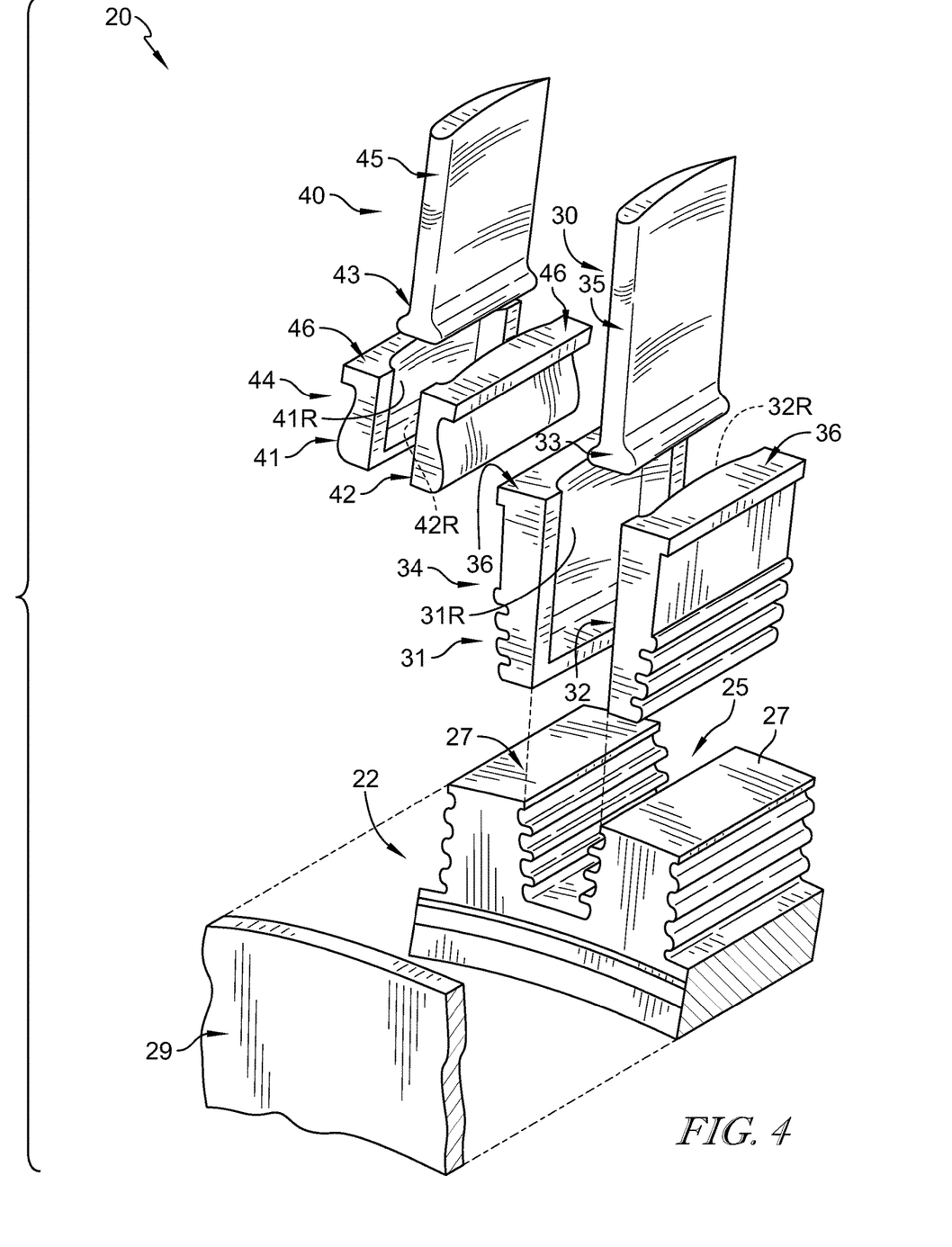
FIG. 4 is an exploded perspective assembly view of a portion of the turbine wheel of FIGS. 2 and 3 showing that each slot-mounted turbine blade includes an airfoil comprising ceramic matrix composite materials and a pair of slot-mounted clamp blocks that form a root of the slot-mounted turbine blade when assembled, and further showing that each edge-mounted turbine blade includes an airfoil comprising ceramic matrix composite materials and edge-mounted clamp blocs that form a root of the edge-mounted turbine blade when assembled.
Figure 5:
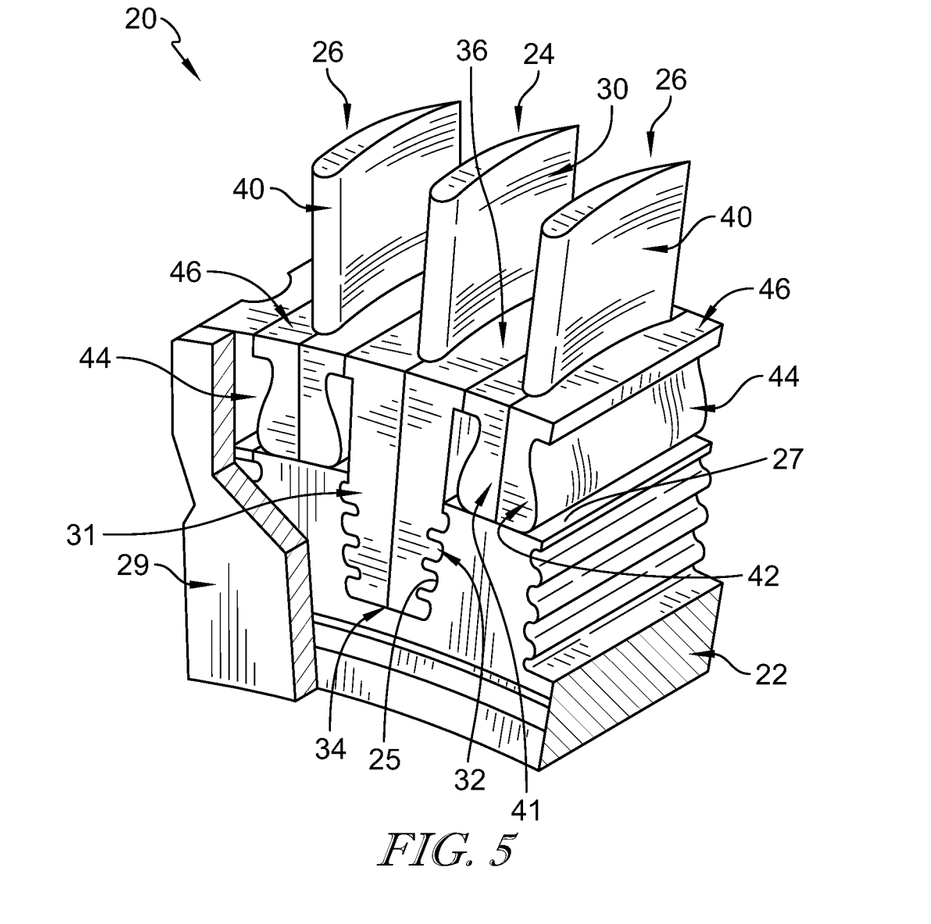
FIG. 5 is a perspective view of the turbine wheel assembly of FIGS. 1-4 when assembled with a portion of a cover plate cut away to show the attachment of the slot-mounted turbine blades and the edge-mounted turbine blades to the disc.

In the illustrated embodiment, the turbine wheel assembly 20 includes slot-mounted turbine blades 24 and edge-mounted turbine blades 26 as shown in FIGS. 3 and 4. The slot-mounted turbine blades 24 are coupled to the disc 22 via insertion into slots 25 defined by the disc 22. The edge-mounted turbine blades 26 are coupled to the disc 22 by bonding to the disc 22.

Each slot-mounted turbine blade 24 has a radial height greater than that of each edge-mounted turbine blade 26 as shown in FIG. 3. In the illustrative embodiment, each slot-mounted turbine blade 24 includes an airfoil 30, a root 34, and a platform 36 as shown in FIG. 3. The airfoil 30 is made from ceramic matrix composite materials adapted to extend into a primary gas path 15 of the engine 10. The root 34 is inserted into a corresponding slot 25 in the disc 22 to couple the slot-mounted turbine blade 24 to the disc 22. The platform 36 extends circumferentially and axially from the airfoil 30 at the interface with the root 34 to shield the root 34 and the disc 22 from hot gases interacting with the portion of the airfoil 30 that extends into the gas path 15.

The airfoil 30 of the slot-mounted turbine blade 24 in the illustrated embodiment includes a radially inner portion 33 and a radially-outer portion 35 as shown in FIGS. 3 and 4. The radially inner portion 33 is received in and engaged by the root 34 to couple the root 34 to the airfoil 30. In illustrative embodiments, the radially inner portion 33 has a dovetail shape or some other shape with a radially-outwardly facing surface that is engaged by the root 34. The radially-outer portion 35 extends radially out from the root 34 and disc 22 so as to interact with hot gases in the gas path 15.

The root 34 of the slot-mounted turbine blade 24 has an overall fir tree shape that corresponds to the shape of the slots 25 formed in the disc 22 as shown in FIGS. 3 and 4. When the root 34 is inserted into a corresponding slot 25, the related slot-mounted turbine blade 24 is blocked from moving radially outwardly from the slot 25.

The root 34 is illustratively provided by clamp blocks 31, 32. Each clamp block 31, 32 is made from metallic materials and is shaped to form a recess 31R, 32R that receives a portion of the radially inner portion 33 of the airfoil 30. The clamp blocks 31, 32 are interference fit with the radially inner portion 33 of the airfoil 30 and are bonded to one another by braze or weld to fix the root 34 to the airfoil 30.

The platform 36 is illustratively provided by the clamp blocks 31, 32 as shown in FIGS. 3 and 4. The platform 36 extends circumferentially and axially forward/aft from the airfoil 30 included in the slot-mounted turbine blade 24 to block hot gases interacting with a radially-outer portion 35 of the airfoil 30 from moving radially-inward toward the disc 22. In other embodiments, the platform 36 may be provided as an integral part of the airfoil 30 made from ceramic matrix composite materials or may be supplied by an independent part.

Each edge-mounted turbine blade 26 includes an airfoil 40, a root 44, and a platform 46 as shown in FIGS. 3 and 4. The airfoil 40 is made from ceramic matrix composite materials adapted to extend into a primary gas path 15 of the engine 10. The root 44 is bonded to a radially-outermost surface 27 of the disc 22 by a braze layer or a weld to couple the edge-mounted turbine blade 26 to the disc 22. The platform 46 extends circumferentially and axially from the airfoil 40 at the interface with the root 44 to shield the root 44 and the disc 22 from hot gases interacting with the portion of the airfoil 40 that extends into the gas path 15.

The airfoil 40 of the edge-mounted turbine blade 26 in the illustrated embodiment includes a radially inner portion 43 and a radially-outer portion 45 as shown in FIGS. 3 and 4. The radially inner portion 43 is received in and engaged by the root 44 to couple the root 44 to the airfoil 40. In illustrative embodiments, the radially inner portion 43 has a dovetail shape or some other shape with a radially-outwardly facing surface that is engaged by the root 44. The radially-outer portion 45 extends radially out from the root 44 and disc 22 so as to interact with hot gases in the gas path 15.

The root 44 of the edge-mounted turbine blade 26 has an overall dovetail shape with an inwardly facing surface that complements the radially-outermost surface 27 of the disc 22 (illustratively arcuate) as shown in FIGS. 3 and 4. When the root 44 is bonded to the disc 22, the related edge-mounted turbine blade 26 is fixed relative to the disc 22.

The root 44 is illustratively provided by clamp blocks 41, 42. Each clamp block 41, 42 is made from metallic materials and is shaped to form a recess 41R, 42R that receives a portion of the radially inner portion 43 of the airfoil 40. The clamp blocks 41, 42 are interference fit with the radially inner portion 43 of the airfoil 40 and are bonded to one another by braze or weld to fix the root 44 to the airfoil 40.

The platform 46 is illustratively provided by the clamp blocks 41, 42 as shown in FIGS. 3 and 4. The platform 46 extends circumferentially and axially forward/aft from the airfoil 40 included in the edge-mounted turbine blade 26 to block hot gases interacting with a radially-outer portion 45 of the airfoil 40 from moving radially-inward toward the disc 22. In other embodiments, the platform 46 may be provided as an integral part of the airfoil 40 made from ceramic matrix composite materials or may be supplied by an independent part.

In some embodiments, the root 34 of the slot-mounted turbine blade 24 may include an optional retainer 39. The retainer 39 is shaped to extend radially-outward of and to circumferentially overlap a portion of the root 44 included in the edge-mounted turbine blade 26 to block radially-outward movement of the edge-mounted turbine blade 26 away from the disc 22.

Figure 6:
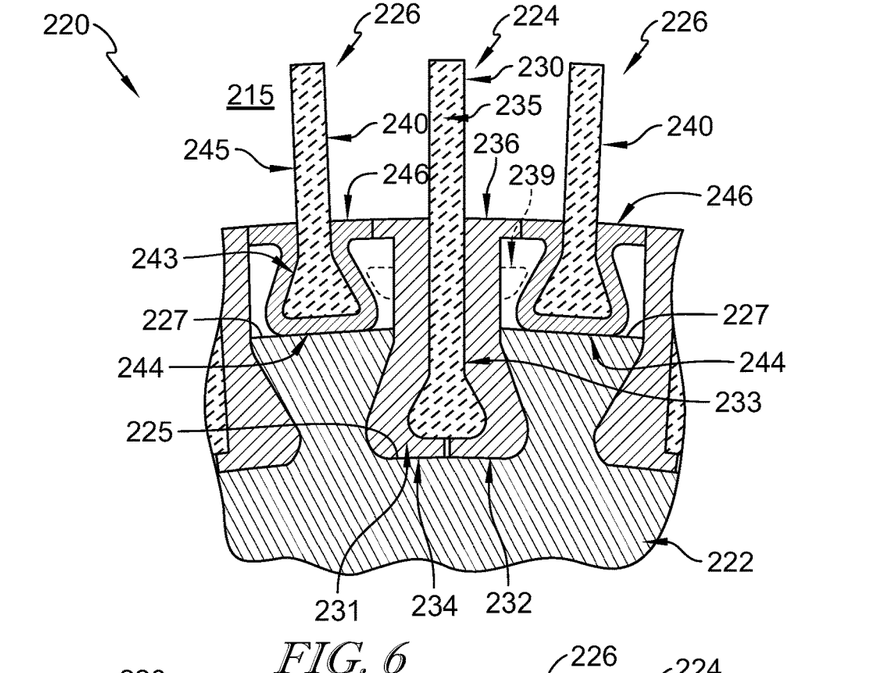
FIG. 6 is a detail cross-sectional view of a portion of another turbine wheel assembly showing that the turbine wheel assembly includes turbine blades of two different varieties, specifically, slot-mounted turbine blades with root features of a dovetail shape that are inserted into slots formed in the disc and edge-mounted turbine blades with root features coupled to the disc along a radially-outwardly facing surface of the disc between slots formed in the disc.
Figure 7:
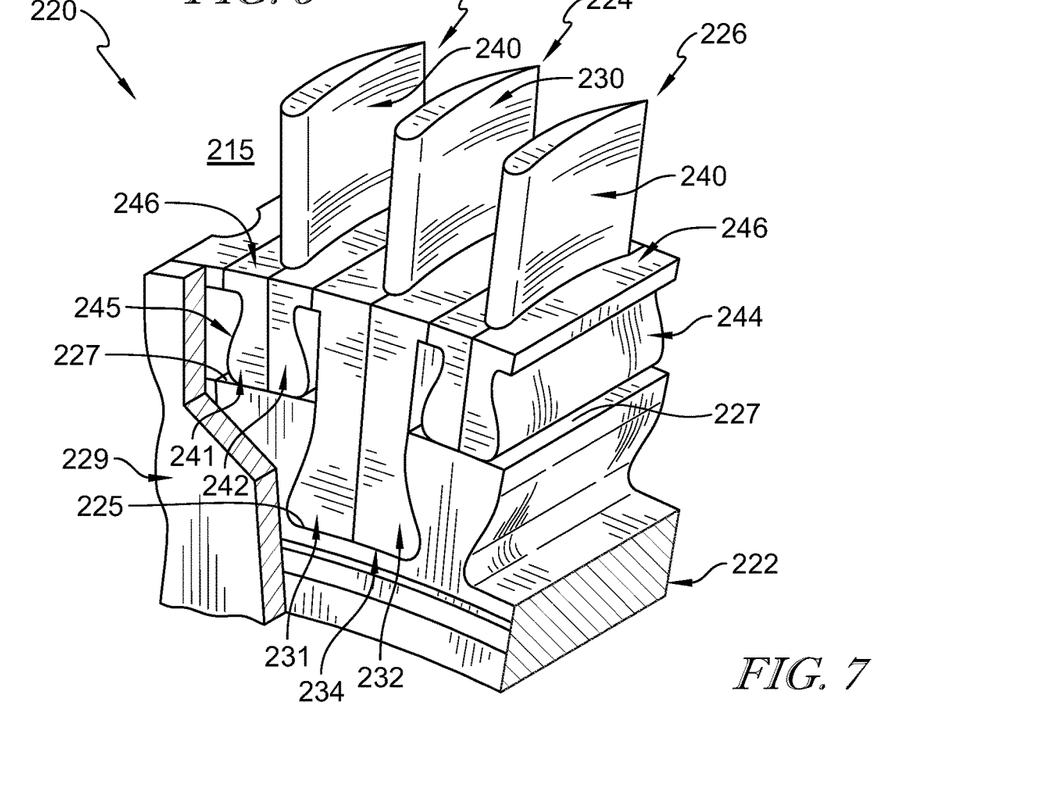
FIG. 7 is a perspective view of the turbine wheel assembly of FIG. 6 when assembled with a portion of a cover plate cut away to show the root features of each type of turbine blade are provided by clamp blocks that engage a radially-inner portion of an airfoil.

A second turbine wheel assembly 220 adapted for use in the turbine section 18 of the gas turbine engine 10 is shown in FIGS. 6 and 7. The second turbine wheel assembly 220 is substantially similar to the turbine wheel assembly 20 shown in FIGS. 1-5 and described herein. Accordingly, similar reference numbers in the 200 series indicate features that are common between the turbine wheel assembly 20 and the turbine wheel assembly 220. The description of the turbine wheel assembly 20 is hereby incorporated by reference to apply to the turbine wheel assembly 220, except in instances when it conflicts with the specific description and drawings of the turbine wheel assembly 220.

Unlike the turbine wheel assembly 20, the second turbine wheel assembly 220 has a root 234 included in the slot-mounted turbine blade 224 with a dovetail shape rather than a fir tree shape as shown in FIGS. 6 and 7. Further, the slots 225 incorporated into the disc 222 have dovetail shapes that correspond to the shape of the roots 234.

Figure 8:
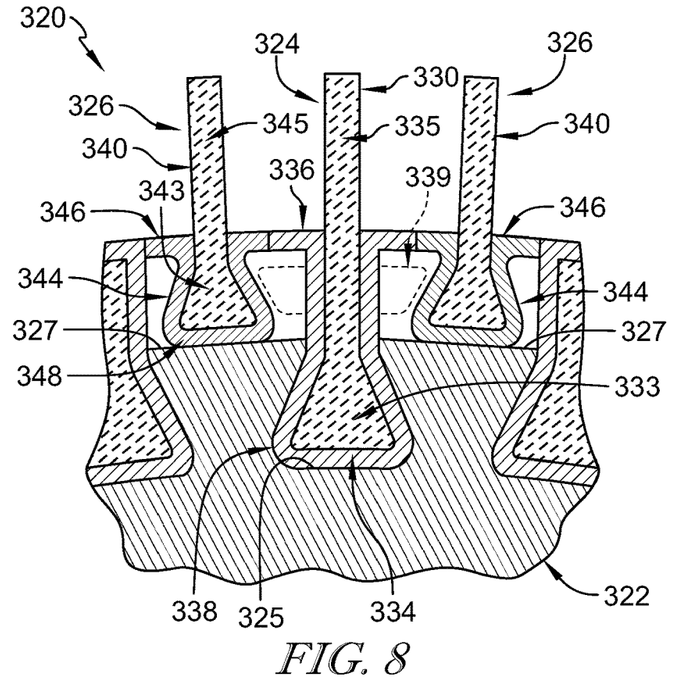
FIG. 8 is a detail cross-sectional view of a portion of a third turbine wheel assembly showing that the turbine wheel assembly includes turbine blades of two different varieties, specifically, slot-mounted turbine blades with root features of a dovetail shape that are inserted into slots formed in the disc and edge-mounted turbine blades with root features coupled to the disc along a radially-outwardly facing surface of the disc between slots formed in the disc.
Figure 9:
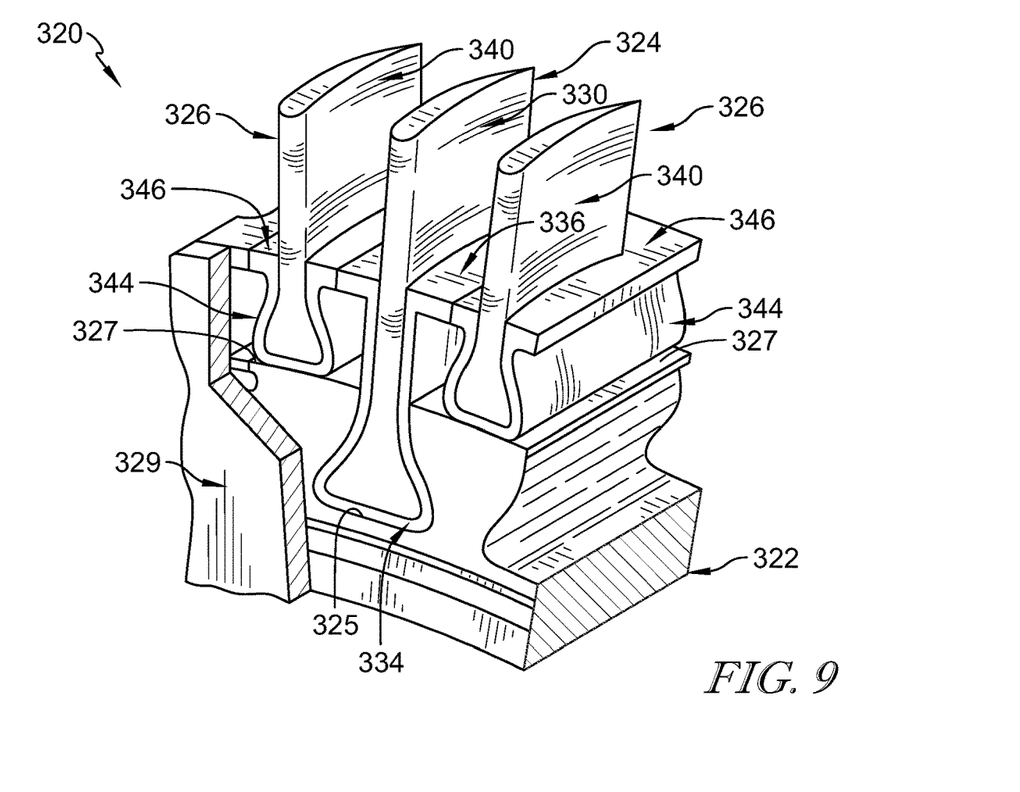
FIG. 9 is a perspective view of the turbine wheel assembly of FIG. 8 when assembled with a portion of a cover plate cut away to show the root features of each type of turbine blade are provided by wraps made from metallic materials that receive a radially-inner portion of an airfoil.

A third turbine wheel assembly 320 adapted for use in the turbine section 18 of the gas turbine engine 10 is shown in FIGS. 8 and 9. The third turbine wheel assembly 320 is substantially similar to the turbine wheel assembly 20 shown in FIGS. 1-5 and described herein. Accordingly, similar reference numbers in the 300 series indicate features that are common between the turbine wheel assembly 20 and the turbine wheel assembly 320. The description of the turbine wheel assembly 20 is hereby incorporated by reference to apply to the turbine wheel assembly 320, except in instances when it conflicts with the specific description and drawings of the turbine wheel assembly 320.

Unlike the turbine wheel assembly 20, the third turbine wheel assembly 320 has a root 334 included in the slot-mounted turbine blade 324 with a dovetail shape rather than a fir tree shape as shown in FIGS. 8 and 9. Further, the slots 325 incorporated into the disc 322 have dovetail shapes that correspond to the shape of the roots 334.

In another aspect of the third embodiment shown in FIGS. 8 and 9, the root 334 and the platform 336 of the slot-mounted turbine blades 324 are provided by a wrap 338 made of metallic materials rather than by clamp blocks. The airfoils 330 of the slot-mounted turbine blades 324 slide into corresponding wraps 338 to couple these components together.

Further, the root 344 and the platform 346 of the edge-mounted turbine blades 326 are provided by a wrap 348 made of metallic materials as shown in FIGS. 8 and 9. The airfoils 340 of the edge-mounted turbine blades 326 slide into corresponding wraps 338 to couple the components together.

It is noted that modern gas turbine engines operate at high pressure and temperature. This can lead to smaller engine cores for previously attained levels of thrust and higher engine component temperatures. The smaller core can reduce turbine disc rim perimeter and can increase the number of turbine blades included in a particular turbine wheel assembly.

To accommodate higher temperatures, materials like ceramic matrix composites can be considered for turbine wheel assembly parts. In particular, components facing or arranged in the primary gas path such as airfoils, platforms, and blade tracks can be made from ceramic matrix composite materials suitable for high temperature environments.

Due to the smaller disc rim, challenges may arise when trying to mount the blades to the disc. Designs in accordance with the present disclosure can allow for combinations of different blade mounting that accounts for the decreased circumference available for such couplings. Specifically, the present disclosure contemplates (among other things) bonded couplings used in conjunction with slide-in couplings. Such designs can avoid all brazed connection approaches. These designs can lower stress in the included components and may allow for lower weight of the complete assembly when compared with earlier designs requiring more metallic components.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine wheel assembly, the assembly comprising
   a disc made of metallic materials arranged around a central axis, the disc shaped to define a plurality of slots spaced around a circumference of the disc that each extend radially-inward from a radially-outermost surface of the disc,
   a slot-mounted turbine blade including an airfoil made of ceramic matrix composite materials and a root provided by a pair of clamp blocks that engage a radially-inner portion of the airfoil, the root being received in one of the plurality of slots defined by the disc and shaped to block radially-outward movement to decouple the slot-mounted turbine blade from the disc, and
   an edge-mounted turbine blade including an airfoil made of ceramic matrix materials and a root provided by a pair of clamp blocks that engage a radially-inner portion of the airfoil, the root being bonded to the radially-outermost surface of the disc to couple the edge-mounted turbine blade to the disc,
   wherein the pair of clamp blocks that provide the root of the slot-mounted turbine blade are shaped to provide a first platform that extends circumferentially from the airfoil included in the slot-mounted turbine blade and is spaced radially outward from the radially-outermost surface of the disc to block hot gases interacting with a radially-outer portion of the airfoil from moving radially-inward toward the disc, and
   wherein the pair of clamp blocks that provide the root of the edge-mounted turbine blade are shaped to provide a second platform that extends circumferentially from the airfoil included in the edge-mounted turbine blade and is spaced radially outward from the radially-outermost surface of the disc to block hot gases interacting with a radially-outer portion of the airfoil from moving radially-inward toward the disc, and
   wherein the slot-mounted turbine blade further includes retainers that each extend circumferentially from the root to overlap a portion of the root included in the edge-mounted turbine blade at a location radially inward of the platform and radially outward of the radially-outermost surface of the disc to block radially-outward movement of the edge-mounted turbine blade away from the disc.

2. The assembly of claim 1, wherein the root of the edge-mounted turbine blade is bonded to the radially-outermost surface of the disc by a braze layer or a weld.

3. The assembly of claim 1, wherein the platform of the slot-mounted turbine blade extends axially-forward and axially-aft of the airfoil included in the slot-mounted turbine blade, and wherein the platform of the edge-mounted turbine blade extends axially-forward and axially-aft of the airfoil included in the edge-mounted turbine blade.

4. The assembly of claim 1, wherein the pair of clamp blocks included in the slot-mounted turbine blade are each shaped to include a recess that receives the radially inner portion of the airfoil included in the slot-mounted turbine blade, and the pair of clamp blocks included in the slot-mounted turbine blade are bonded to one another.

5. The assembly of claim 4, wherein the pair of clamp blocks included in the edge-mounted turbine blade are each shaped to include a recess that receives the radially inner portion of the airfoil included in the edge-mounted turbine blade, and the pair of clamp blocks included in the edge-mounted turbine blade are bonded to one another.

6. The assembly of claim 1, wherein the slot-mounted turbine blade has a radial height that is greater than a radial height of the edge-mounted turbine blade.

7. The assembly of claim 1, wherein the edge-mounted turbine blade is arranged circumferentially adjacent to the slot-mounted turbine blade to provide a gap therebetween.

8. The assembly of claim 7, wherein each retainer extends circumferentially from the root into the gap between the slot-mounted turbine blade and the edge-mounted turbine blade to overlap the root of the edge-mounted turbine blade.

9. A turbine wheel assembly, the assembly comprising
   a disc made of metallic materials arranged around a central axis, the disc shaped to define a plurality of slots spaced around a circumference of the disc that each extend radially-inward from a radially-outermost surface of the disc,
   a slot-mounted turbine blade including an airfoil made of ceramic matrix composite materials and a root that engages a radially-inner portion of the airfoil, the root being received in one of the plurality of slots defined by the disc and shaped to block radially-outward movement to decouple the slot-mounted turbine blade from the disc, and
   an edge-mounted turbine blade including an airfoil made of ceramic matrix materials and a root, the root being bonded to the disc to couple the edge-mounted turbine blade to the disc, wherein the root of the slot-mounted turbine blade is shaped to provide a platform that extends circumferentially from the airfoil included in the slot-mounted turbine blade and provides a portion of a gas path surface of a primary gas path that is spaced apart radially from the radially-outermost surface of the disc by a first distance to block hot gases within the gas path from moving radially-inward toward the disc, and wherein the root of the edge-mounted turbine blade is shaped to provide a platform that extends circumferentially from the airfoil included in the edge-mounted turbine blade and provides a portion of the gas path surface of the primary gas path that is spaced apart radially from the radially-outermost surface of the disc by the first distance to block hot gases within the gas path from moving radially-inward toward the disc.

10. The assembly of claim 9, wherein the edge-mounted turbine blade is arranged circumferentially adjacent to the slot-mounted turbine blade and is bonded to the radially-outermost surface of the disc.

11. The assembly of claim 10, wherein the edge-mounted turbine blade is bonded to the radially-outermost surface of the disc by one of a braze layer and a weld.

12. The assembly of claim 9, wherein the root of the edge-mounted turbine blade is made of metallic materials.

13. The assembly of claim 12, wherein the root of the edge-mounted turbine blade is provided by a pair of clamp blocks shaped to receive a radially-inner portion of the airfoil included in the edge-mounted turbine blade and bonded to one another to prevent movement of one clamp block away from the other.

14. The assembly of claim 12, wherein the root of the edge-mounted turbine blade is provided by a wrap shaped to receive a radially-inner portion of the airfoil included in the edge-mounted turbine blade.

15. The assembly of claim 9, wherein the root of the slot-mounted turbine blade is made of metallic materials.

16. The assembly of claim 15, wherein the root of the slot-mounted turbine blade is provided by a pair of clamp blocks shaped to receive a radially-inner portion of the airfoil included in the slot-mounted turbine blade and bonded to one another to prevent movement of one clamp block away from the other.

17. The assembly of claim 15, wherein the root of the slot-mounted turbine blade is provided by a wrap shaped to receive a radially-inner portion of the airfoil included in the slot-mounted turbine blade.

18. The assembly of claim 9, wherein the slot-mounted turbine blade further includes retainers that each extend circumferentially from the root to overlap a portion of the root included in the edge-mounted turbine blade at a location that is spaced radially inward of the platform and radially outward of the radially-outermost surface of the disc to block radially-outward movement of the edge-mounted turbine blade away from the disc.

19. The assembly of claim 18, wherein the edge-mounted turbine blade is arranged circumferentially adjacent to the slot-mounted turbine blade to provide a gap therebetween that extends radially from the radially-outwardly facing surface of the disc to the platform of the slot-mounted turbine blade and the platform of the edge mount turbine blade, and wherein each retainer extends circumferentially from the root into the gap between the slot-mounted turbine blade and the edge-mounted turbine blade to overlap the root of the edge-mounted turbine blade.

20. The assembly of claim 9, wherein the root of the edge-mounted turbine blade has a radially-inwardly facing surface that is bonded to the radially-outermost surface of the disc, the root of the slot-mounted turbine blade has a radially-inwardly facing surface that faces the disc when in one of the plurality of slots, and the platform of the slot-mounted turbine blade is spaced apart radially from the radially-inwardly facing surface of the root included in the slot-mounted turbine blade a second distance that is greater than the first distance.

* * * * *